United States Patent [19]
Ali et al.

[11] Patent Number: 5,756,165
[45] Date of Patent: May 26, 1998

[54] HIGH SPEED METHOD FOR COATING AND CURING OPTICAL FIBER

[75] Inventors: Yussuf Sultan Ali, Fanwood; Darryl Leneir Brownlow, Bridgewater; Alex Harris, Maplewood; Nicholas James Levinos, Hampton, all of N.J.; Robert Clark Moore, Roswell, Ga.; Lloyd Shepherd, Madison, N.J.

[73] Assignee: Lucent Technologies Inc., Murray Hill, N.J.

[21] Appl. No.: 716,802

[22] Filed: Sep. 16, 1996

Related U.S. Application Data

[63] Continuation of Ser. No. 425,632, Apr. 20, 1995, abandoned.
[51] Int. Cl.$^6$ .................... B05D 5/06; C08J 7/04
[52] U.S. Cl. .............. 427/513; 427/163.2; 427/177; 427/178; 427/379; 427/385.5
[58] Field of Search ................ 427/513, 163.2, 427/385.5, 379, 177, 178; 65/447

[56] References Cited

U.S. PATENT DOCUMENTS

| | | | |
|---|---|---|---|
| 4,388,093 | 6/1983 | Kimura et al. | 65/3.11 |
| 5,194,112 | 3/1993 | Filan | 427/163.2 |
| 5,219,623 | 6/1993 | Petisce | 427/163.2 |
| 5,345,528 | 9/1994 | Katz et al. | 385/123 |
| 5,352,392 | 10/1994 | Johnson et al. | 264/22 |
| 5,352,712 | 10/1994 | Shustack | 427/163.2 |
| 5,593,736 | 1/1997 | Cowen | 427/163.2 |

FOREIGN PATENT DOCUMENTS

A-01-278435  11/1989  Japan.

Primary Examiner—Janyce Bell
Attorney, Agent, or Firm—Glen E. Books, Esq.

[57] ABSTRACT

Applicants have discovered that the speed of fiber manufacture can be substantially increased by employing a two-step curing process in which the fiber is drawn, coated and exposed to ultraviolet light on-line at high line speeds to effect a partial cure of the coating. After further cooling, the partially cured coating is fully cured by an on-reel exposure to ultraviolet light. The on-reel exposure can take place on the draw tower take-up reel as it is filling with fiber or it can take place off-line after the take-up reel has been filled and removed from the line. The on-reel exposure advantageously takes place either during filling the take-up reel, or during emptying the reel, so that each layer of fiber on the reel is exposed equally to the ultraviolet light. This method of UV illumination improves the energy efficiency in the second exposure by at least a factor of 10 to as much as a factor of 1000. The fiber primary coating pullout strength and mechanical modulus are enhanced.

6 Claims, 3 Drawing Sheets

HIGH SPEED METHOD FOR COATING AND CURING OPTICAL FIBER

This application is a continuation of Ser. No. 08/425,632 filed Apr. 20, 1995, now abandoned.

FIELD OF THE INVENTION

The present invention relates to methods for making polymer-coated optical fiber and, in particular, to improved methods for coating and curing such fiber. The improved methods provide higher speed, improved coatings, lower processing cost and enhanced energy efficiency.

BACKGROUND OF THE INVENTION

Optical fibers are key components in modern telecommunications systems. Optical fibers are thin strands of glass capable of transmitting an optical signal containing a large amount of information over long distances with very low loss. In essence, an optical fiber is a small diameter waveguide characterized by a core with a first index of refraction surrounded by a cladding having a second (lower) index of refraction. Light rays which impinge upon the core at an angle less than a critical acceptance angle undergo total internal reflection within the fiber core. These rays are guided along the axis of the fiber with minimum attenuation. Typical optical fibers are made of high-purity silica with minor concentrations of dopants to control the index of refraction.

Commercial optical fibers are provided with polymer coatings, such as urethane-acrylate coatings, to protect the fibers from mechanical abrasion and microbending stresses. The coatings are typically applied immediately after the fiber is drawn and cured on-line with ultraviolet light in a continuous process of drawing, coating and curing. The coated fiber is then wound onto reels for storage.

The usual process of fiber coating and curing presents problems of cure speed, cost and energy efficiency. The curing step is a relatively slow step which limits the speed of the continuous process. While higher draw and coating speeds are possible, the curing step has limited the speed of typical commercial processes to about 5 meters per second. Since there is a practical limit to the UV intensity derived from high power UV lamps, increasing the draw speed typically demands the use of longer, high power lamp systems that illuminate the coated fiber over a longer length. This modification is expensive both because of the expense of high power UV lamps and because of the use of more vertical space on the draw tower for curing. Continuous curing is also energy inefficient. Typically, the moving coated fiber is passed through one focus of a cylindrical elliptical reflector with an ultraviolet lamp at the other focus. However, the diameter of the focused ultraviolet light must be larger than the fiber diameter for easy alignment. Typically, only a few percent of the light is absorbed by the coating in a single illumination.

An additional difficulty with the conventional continuous coating process is that the coating cure takes place at elevated temperature, estimated to be 120°–150° C. This is due to the elevated temperature of the glass at the time of coating, the heat from the high power UV lamps, and the heat released by the curing reaction itself. The elevated curing temperatures can deteriorate the mechanical properties of the polymer coating, including the mechanical modulus (measured by an in situ modulus test) and the fiber primary coating pullout force (one measure of coating/glass adhesion). Both a stable, well-controlled mechanical modulus and a high pullout force are important factors for coatings on commercial coated fiber. Accordingly, there is a need for an improved process for coating and curing optical fiber.

SUMMARY OF THE INVENTION

Applicants have discovered that the speed of fiber manufacture can be substantially increased by employing a two-step curing process in which the fiber is drawn, coated and exposed to ultraviolet light on-line at high line speeds to effect a partial cure of the coating. After further cooling, the partially cured coating is fully cured by an on-reel exposure to ultraviolet light. The on-reel exposure can take place on the draw tower take-up reel as it is filling with fiber or it can take place off-line after the take-up reel has been filled and removed from the line. The on-reel exposure advantageously takes place either during filling the take-up reel, or during emptying the reel, so that each layer of fiber on the reel is exposed equally to the ultraviolet light. This method of UV illumination improves the energy efficiency in the second exposure by at least a factor of 10 to as much as a factor of 1000. The fiber pullout strength and mechanical modulus are enhanced.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for the graph, are not to scale.

DETAILED DESCRIPTION

Figure 1:
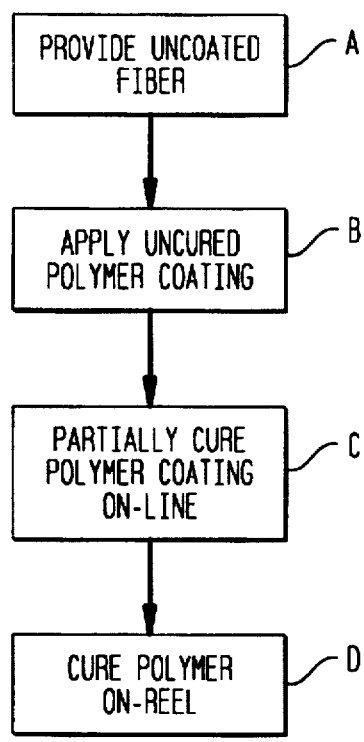
FIG. 1 is a schematic block diagram of the steps in making a polymer coated fiber.

Referring to the drawings, FIG. 1 is a schematic block diagram of an improved process for making polymer-coated optical fiber. The first step shown in block A is to provide uncoated fiber. Preferably fiber is provided by drawing from a glass preform. It differs from conventional practice in that the fiber is drawn at a faster rate, preferably in the range 10–20 m/s or more.

The next step shown in block B is to apply uncured polymer to the fiber.

The uncured polymer is preferably applied by passing the drawn fiber through one or more baths of uncured polymer liquid. In typical applications the fiber will be given a dual coating comprising a primary (inner) coating and a secondary (outer) coating. The polymer coatings can be any one of a variety of polymers including hydrocarbon polymers, polyethers, polycarbonates, polyesters and silicones. The primary coating is advantageously formulated to provide a soft rubbery texture whereas the secondary coating advantageously produces a more highly cross-linked, glossy texture. The polymers are preferably terminated by urethane acrylates. Coatings comprising hydrocarbon polymers terminated with urethane acrylates are described in U.S. Pat. No. 5,146,531 entitled Ultraviolet Curable Coatings For Optical Fibers and Optical Fibers Coated Therewith issued to Paul J. Shustack on Sep. 8, 1992. Coatings comprising polycarbonate polymers terminated with urethane-acrylates are described in International Application W091/03503 published under the Patent Cooperation Treaty on Mar. 21, 1991 and entitled "Primary Coating Composition For Optical Glass Fibers."

The third step illustrated in Block C is to partially cure the polymer coating on-line at high speed. Specifically, the fiber covered with uncured polymer is passed through one or more UV curing lamps at a high speed (10–20 m/s) despite the fact that the lamps cannot completely cure the polymer coating at this speed. The objective is to obtain a sufficient partial cure of the outer polymer coating that the fiber leaving the lamp can be wound onto a reel without sticking together or being permanently deformed. This is preferably accomplished by a cure in the range 55–75% of double bond conversion.

Figure 2:
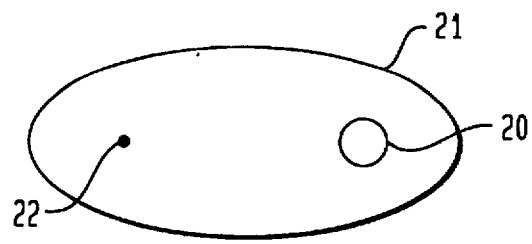
FIG. 2 illustrates apparatus useful in effecting the on-line partial cure in the process of FIG. 1.

The preferred apparatus for performing the on-line partial cure is the conventional UV lamp arrangement depicted in FIG. 2 comprising a UV lamp 20 and a cylindrical reflector 21 with an elliptical cross section. The lamp is advantageously aligned along one focal line, and the fiber 22 is passed along the other focal line so that reflected radiation is concentrated on the fiber.

The next step, after further cooling, is to complete the cure of the polymer on-reel. Preferably this is done as the fiber is taken off-line by winding onto the tower take-up reel. Alternatively, the fiber can be given the on-reel cure in a subsequent unwinding of the take-up reel, as in a reel-to-reel transfer. Preferably, this step further cures the fiber to a cure level of 90–95% of double bond conversion.

Figure 3:
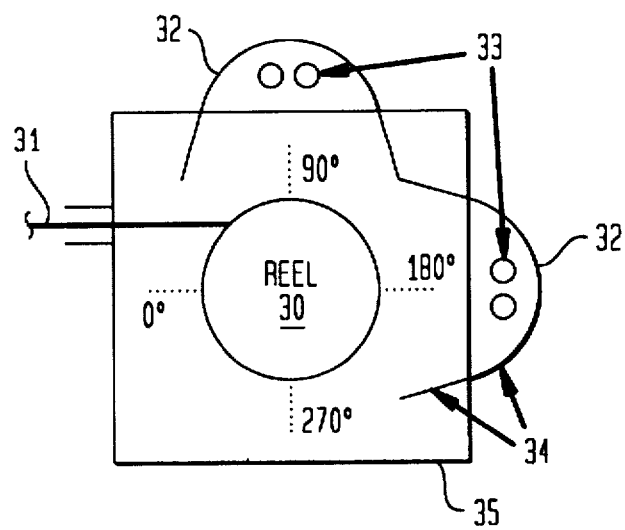
FIG. 3 illustrates preferred apparatus for effecting the on-reel final cure in the process of FIG. 1.

FIG. 3 schematically illustrates apparatus for performing the on-reel cure comprising a reel 30 of partially cured fiber 31 and a pair of UV lamps 32 (each comprising a pair of bulbs 33) extending parallel to the reel axis. Reflectors 34 are provided for directing light from the bulbs toward the reel. Rotation of the reel about its axis provides exposure to all of the fiber. Advantageously the second cure can be accomplished while the reel is being filled during take up or while it is being emptied during rewind, so that all layers of fiber on the reel are exposed equally to ultraviolet light. To optimize the reaction efficiency, the ultraviolet light should be reflected to evenly illuminate the face of the reel rather than being focused to a line or point Advantageously, the reflectors 34 extend close to the reel in order to protect workers from direct exposure to UV light, and end shields 35 are provided for the same purpose.

The method of FIG. 1 and its advantages in the fabrication of optical fiber can be better understood by consideration of the following example.

EXAMPLE

Figure 4:
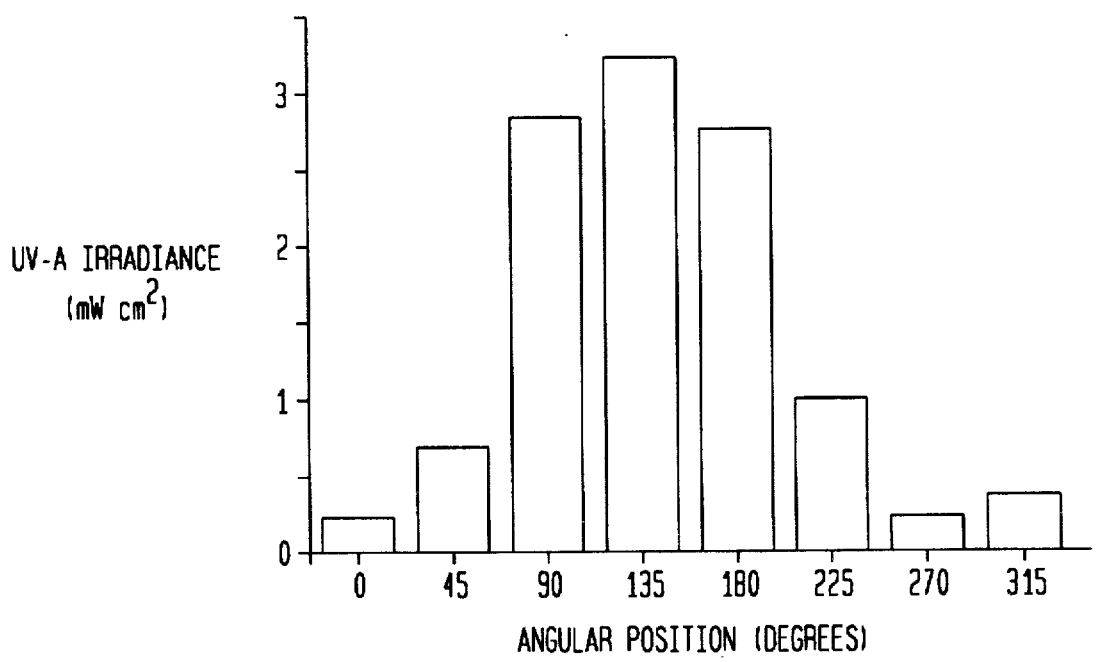
FIG. 4 is a graphical illustration for the UV intensity as a function of angular position on the reel for the apparatus of FIG. 3.

On-reel cure experiments were carried out using UV A black light lamps illuminating a reel of fiber as it was unwound at various speeds. The setup was as diagrammed in FIG. 3. The experiments used XX-15A black lights from Spectronics Corp. These black light bulbs have a total power of 15W each, and produce approximately 1 mW/cm$^2$ UV A intensity at 10" from the bulb. The bulbs are 12" long, and were mounted in pairs in standard fixtures similar to fluorescent light fixtures, with integral aluminum reflectors. Experiments were run with either two or four fixtures arranged around the reel, giving either four or eight lamps illuminating the reel. To check the actual dose at the fiber surface, an International Light Lightbug monitor was mounted on a reel and used to monitor the UV intensity when two fixtures (four lamps) were running. The UV intensity as function of angular position is shown in FIG. 4. As can be seen, the total UV intensity is about equivalent to an intensity of 2.5 mW/cm$^2$ illuminating half of the reel surface. In the case of four fixtures (eight lamps), the extra two fixtures illuminate the back side of the reel, so that the total intensity is roughly equivalent to 2.5 mW/cm$^2$ on the entire reel surface.

Several reels of fiber with undercured acrylate-based fiber were obtained. The coating was undercured, with primary cure levels, as measured by infrared spectroscopy, of 60–70%. The reels typically had ~20 km of fiber.

To boost cure levels, the fiber was unwound onto a takeup reel (not illuminated) and rewind was begun at the same time that the lamps were turned on. Two km of fiber were rewound in order to ensure that the unwinding reel reaches a steady cure level. Then the fiber was cut, and the fiber on the unwinding reel was examined by sampling several meter sections using infrared analysis. It was found that the increased cure due to the lamps penetrates about 750 m (of fiber) into the reel, or about 3 complete, close-packed fiber layers. (The actual amount of fiber in each layer is closer to 150 meters, because the layers are not close-packed.) The penetration depth suggests that the UV penetration is sufficient to guarantee a uniform cure on the under side vs. the top side of each fiber layer. The cure on the top layer of fiber is used as a measure of the steady state value of cure at each rewind speed.

Figure 5:
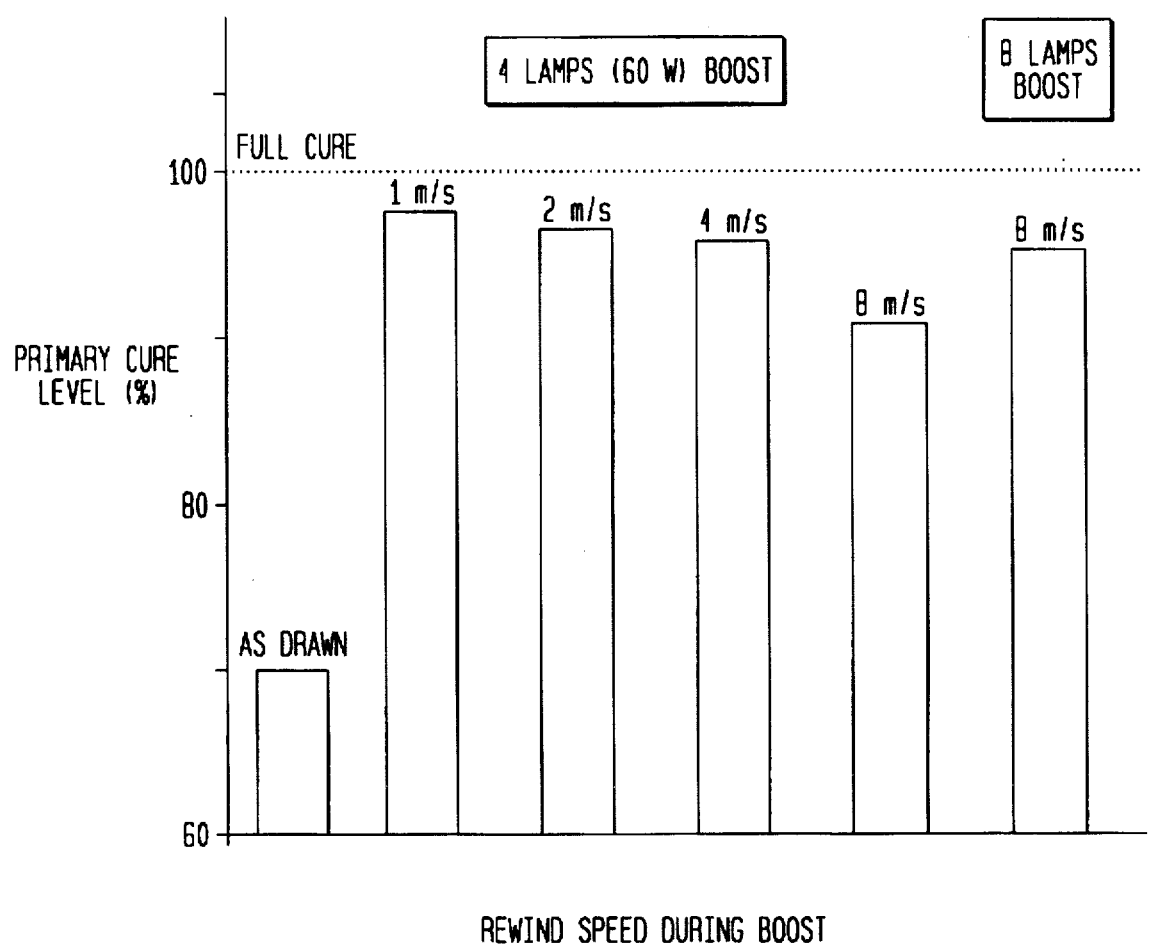
FIG. 5 illustrates cure levels for fibers cured during rewinding at several speeds.

FIG. 5 shows the results for a fiber which has an initial primary cure level of 70%, recured with either 4 or 8 lamps. The boost cure with 4 lamps, representing 60W of total power, is 92% at 8 m/s rewind speed, and is better at slower speeds. With 8 lamps, the cure is essentially complete, even at 8 m/s.

The advantages of this two-step curing process are substantial. The higher line speed increases throughput proportionately. And surprisingly, the second cure on the reel reduces the necessary ultraviolet power by a factor of several tens to several thousand. All of the ultraviolet light can be imaged onto the face of the reel so that nearly 100% of the light is absorbed by the coating. Moreover the illumination can be for longer times at lower power levels which is more efficient in inducing polymerization reactions. Yet a third advantage accrues because the fiber can cool from its elevated temperatures to a temperature preferably less than 50° C. before the final cure. This produces an enhanced cure with enhanced pullout strength and higher in situ modulus.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

The invention claimed is:

1. A method for making polymer-coated optical telecommunications fiber comprising the steps of:

providing uncoated optical fiber;

applying a coating of uncured polymer to said uncoated optical fiber;

partially curing said uncured polymer coating on line at a speed which is too fast to fully cure the polymer;

winding said fiber onto a reel; and fully curing said polymer coating on said reel by exposing said reel to ultraviolet light.

2. The method of claim 1 wherein said uncoated optical fiber is provided by drawing said fiber from a preform and said uncured polymer is applied on-line to the drawn fiber.

3. The method of claim 1 wherein said uncured polymer coating is partially cured by passing the fiber past a source of ultraviolet light.

4. The method of claim 1 wherein said partially cured fiber coating is fully cured at a temperature T<50° C.

5. A method for making polymer-coated optical fiber comprising the steps of:

providing uncoated optical fiber;

applying a coating of uncured polymer to said optical fiber;

partially curing said uncured polymer coating on line at a speed which is too fast to fully cure the polymer;

winding said fiber onto a reel; and fully curing said polymer coating on said reel by exposing said reel to ultraviolet light while said fiber is winding onto said reel.

6. A method for making polymer-coated optical fiber comprising the steps of:

providing uncoated optical fiber;

applying a coating of uncured polymer to said optical fiber;

partially curing said uncured polymer coating on line at a speed which is too fast to fully cure the polymer;

winding said fiber onto a reel;

fully curing said polymer coating on said reel by exposing said reel to ultraviolet light while said fiber is being taken off said reel.

* * * * *